June 4, 1935. F. G. LOGAN 2,003,945
ELECTRIC CONTROLLING APPARATUS
Filed Sept. 5, 1931 2 Sheets-Sheet 1

INVENTOR
Frank G. Logan
BY
Lawrence K. Sager
his ATTORNEY

June 4, 1935. F. G. LOGAN 2,003,945
ELECTRIC CONTROLLING APPARATUS
Filed Sept. 5, 1931 2 Sheets-Sheet 2

Frank G. Logan INVENTOR
BY Lawrence K. Sager
his ATTORNEY

Patented June 4, 1935

2,003,945

UNITED STATES PATENT OFFICE 2,003,945

ELECTRIC CONTROLLING APPARATUS

Frank G. Logan, Mount Vernon, N. Y., assignor to Ward Leonard Electric Company, a corporation of New York Application September 5, 1931, Serial No. 561,396

12 Claims. (Cl. 171—119)

This invention relates to the control of the voltage and current in a consumption circuit; and although it may be applied to various uses, it is particularly applicable to the control of lighting circuits where they are to be controlled from maximum brilliancy of the lamps to complete black-out and to other applications in which wide adjustment or variations of output is required.

One important object of the invention is to obtain a very wide range of control of the voltage applied to and of the current passing in a consumption circuit. Another object is to accomplish this by the use of apparatus which may be economically made and by the use of devices of a simple character. Another object is to insure dependable operation and durability. Another object is to provide apparatus which will be economical in operation and avoid material waste of energy by dissipation thereof, such as in the form of heat energy. Another object is to provide apparatus which will occupy a comparatively small amount of space. Another object is the provision of a character of apparatus which will permit control thereof at a point remote therefrom and by use of only a small amount of controlling energy, and by a comparatively small and conveniently operated and connected device. Other objects and advantages will be understood by those skilled in the art from the following description and accompanying drawings.

Figure 1:
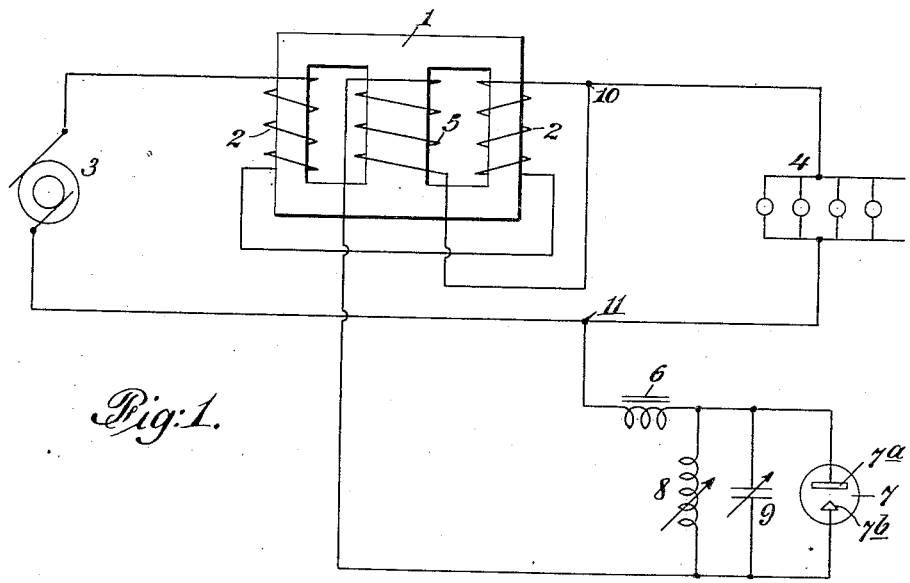
Figure 2:
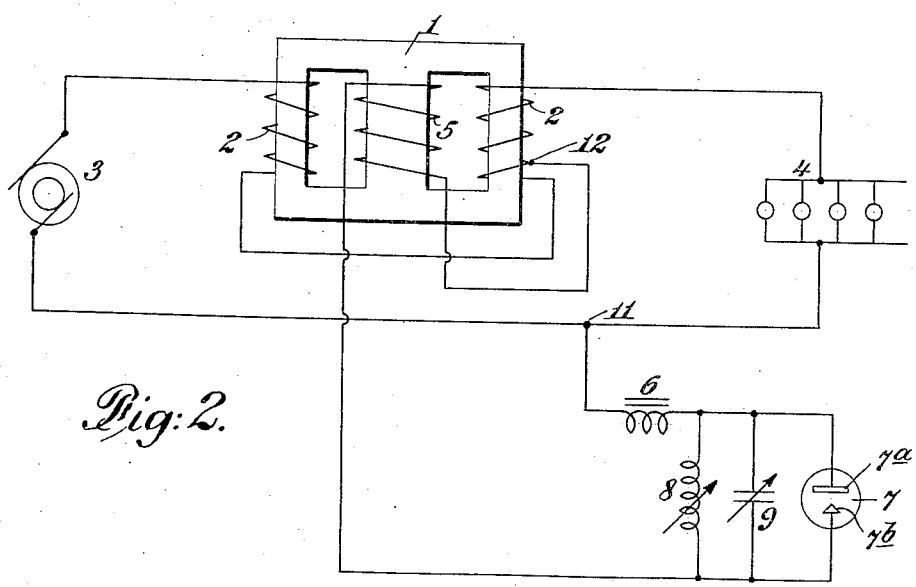
Figure 3:
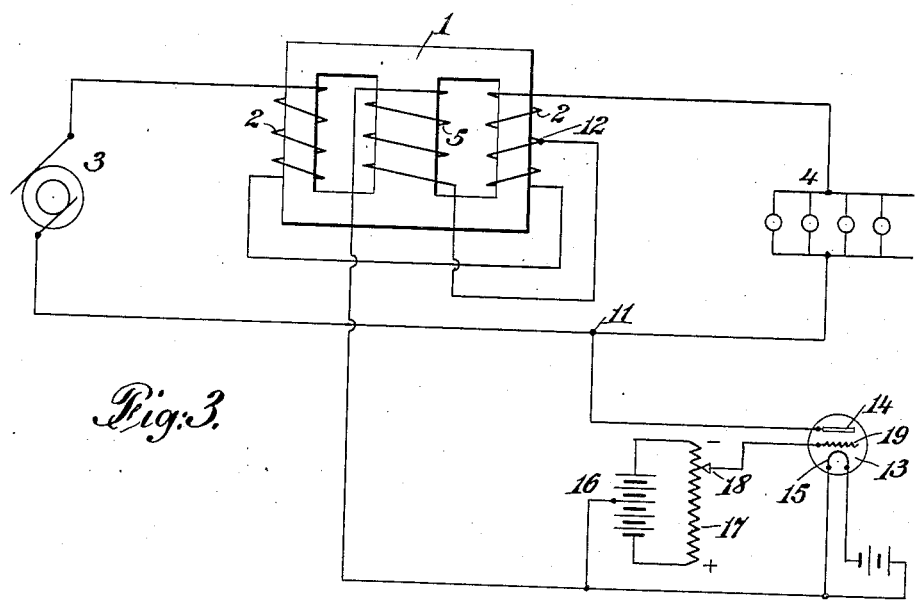
Figure 4:
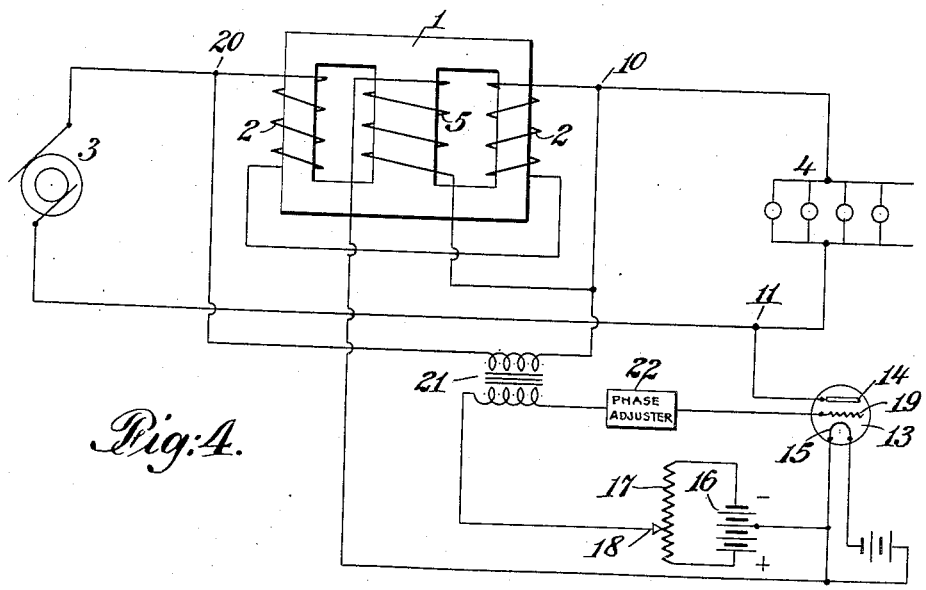

Fig. 1 is a diagram of one embodiment of the invention; Fig. 2 is a similar diagram with a change of one of the connections; and Figs. 3 and 4 are diagrams showing other embodiments of the invention.

In prior voltage and controlling apparatus there are various types wherein the range of control secured is limited either by the inherent character of the apparatus, or by the fact that to extend the range of control thereof would greatly increase the cost and size of the component parts. By the present invention I combine and interrelate a plurality of controlling means in such a manner that they interact to each assist the other in such relationship that the resultant range of control is much beyond that which could be obtained from them separately and is also much beyond the result of their mere addition.

One of the most usual forms of reactor for controlling the voltage and current of a consumption circuit is of the type where a core is excited by one or more windings carrying the utilized energy and the control is secured by varying the flux density of the core by means of an auxiliary winding adapted to vary the independent excitation of the core.

In the drawings, one form of such a reactor is indicated by the three-legged core 1 having alternating current windings 2 on the outside legs supplied with energy from the alternating current source 3 and in series with the consumption circuit having the translating devices 4. The middle leg of this core is excited by a direct current winding 5. As the current in this winding is varied from a minimum to a maximum, the voltage and current supplied to the consumption circuit is controlled in a well-understood manner.

In my pending application Serial Number 535,600, filed May 7, 1931, I have disclosed an improved method and relationship of apparatus for varying the voltage and current supplied to the consumption circuit by varying the control of the transient conditions or the phase relationship so that the voltage and current of the consumption circuit are varied as desired between limits. In Fig. 1 of the present application, one form of such controlling means is provided comprising a series reactor 6, a half wave rectifier 7 having an anode 7a and cathode 7b, in series with the reactor 6 and a variable controlling resistance or impedance device 8, or a capacitive device 9, or both, connected across the terminals of the rectifier 7. The device 8 or 9, or both, controls, as desired, the voltage and current supplied to any translating device in series in the circuit of the rectified current. This is more fully explained and discussed in my said pending application and need not be repeated here.

In the present case, the translating device in series with the rectifier 7 and subjected to the rectified current of the circuit, is the direct current winding 5 of the reactor. Thus, change of the controlling device 8, or device 9, or both, will cause change of current in the winding 5. In the present case, the circuit of the winding 5 and rectifier 7, which latter may be of any form desired, is connected, not to a source of alternating current of constant voltage, but across the circuit of the translating device 4. Thus, the current in the circuit of the rectifier 7 is not only caused to be varied by merely the adjustment of the controlling device 8, or 9, but also by the change of alternating current voltage which is applied to the terminals 10, 11 of the circuit containing the rectifier and winding 5, giving a compounding effect and greatly extending the range of control secured thereby.

In operation, let it be assumed that the lamps 4 of the lighting circuit are at full brilliancy. In such a case the current in the winding 5 is a maximum and by reason of the core being saturated by the direct current flux, or near saturation, the reactance and counter electromotive force of the windings 2 are low, permitting nearly all of the voltage of the source 3 to be applied to the consumption circuit and supply full current thereto. Under this condition, the device 8, or device 9, or both, has been adjusted to include a maximum amount of resistance or impedance in its shunting circuit so as to permit the rectifier 7 to pass its full value of the rectified current through the winding 5. At that time the circuit of the rectifier receives its maximum voltage at the connections 10 and 11, the same as the load 4 is then receiving its maximum voltage. Thus, as regards the voltage applied to the rectifier circuit and the controlling device 8, or 9, or both, the conditions are such as to cause maximum direct current to be passed through the winding 5. When it is desired to reduce the voltage and current of the consumption circuit 4, the devices 8 or 9, or both, are adjusted, both to affect the transient conditions or phase conditions of the rectifier circuit, so as to reduce the output of the rectifier 7. This in itself, of course, reduces the current in the winding 5 and thereby permits the core 1 to become more reactive and by reason of its increased reactance, the counter electro-motive force of the alternating current windings 2 is increased and the voltage applied to the load 4 corresponding reduced with a corresponding reduction in load current. Moreover, an additional compound action takes place, because obviously the terminals 10 and 11 are then similarly subjected to a reduced voltage, which has the additional effect of reducing the voltage applied to the rectifier circuit and correspondingly reduce the output from the rectifier to the winding 5. Thus each of the controlling means reacts upon the other to greatly accentuate the change in the voltage and current applied to the load 4. The resultant effect of this compounding and reciprocal inter-action is that a comparatively small change in the adjustment of the controlling devices 8, or 9, or both, produces a very pronounced change in the consumption circuit. Furthermore, the range of control is greatly extended to very wide limits which are much beyond the limits of the separate controlling means and are beyond the limits of their mere addition.

Fig. 2 has its parts correspondingly numbered to those of Fig. 1, but in Fig. 2 the connection 10 is shifted to the point 12, which is an intermediate point in the circuit of the alternating current coils 2. It is evident in this case that the circuit of the rectifier is not subjected to the full variation of the voltage which is applied to the load 4, but to an intermediate value depending upon the point at which the connection 12 is tapped into the circuit of the windings 2. This intermediate connection may be used where it is desired to avoid the benefit of the full range of control and to reduce the compounding effect to suit the conditions required in any particular case.

In Fig. 3 is shown, as an example, another embodiment of this invention where a three element rectifier is indicated in the form of the usual vacuum tube 13. The plate 14 of the tube is connected to one side of the consumption circuit at 11, as in Figs. 1 and 2. The filament 15 is connected to one terminal of the direct current winding 5 so that a rectified current is supplied to the winding 5. The other terminal of the winding 5 is shown connected at an intermediate point 12 of the circuit of the windings 2, as in Fig. 2, and it could obviously be connected to any intermediate point, or at the point 10, as in Fig. 1, at one side of the consumption circuit. A battery 16 is shown connected to a variable resistance 17, so that the adjustable contact 18 engaging it, may be subjected to any potential desired between the limits of the positive and negative terminal of the battery 16. This adjustable contact 18 is connected to the grid 19 and correspondingly varies the grid potential.

It is well known that with a fixed plate voltage and a limited swing of the grid potential, a certain range of variation of current in the plate circuit may be secured. But in the present case, when the grid potential is varied, the voltage of the plate circuit also changes, because it is subjected to the change of voltage applied to the consumption circuit represented by the load 4. This gives a compounding effect and interaction of the controlling means so as to greatly increase the range of control of the voltage and current in the consumption circuit in a manner similar to that already described with reference to Figs. 1 and 2. When the grid potential is adjusted to approach zero relation to the cathode represented by the filament 15, or even to be the same, or nearly the same, as that of the anode, represented by the plate 14, (the latter condition being allowable when there is no objection to taking current from the source of grid potential), maximum current flows in the plate circuit giving maximum current in the winding 5 and maximum voltage applied to the load 4 and to the plate circuit by reason of its connected relationship to the consumption circuit. As the grid is made more negative with respect to the cathode or filament 15, less current will be delivered in the plate circuit and in the winding 5 resulting in a reduction of the voltage applied to the consumption circuit, which in turn reduces the voltage applied to the plate circuit and by such a compounding effect greatly increases the range of control of the voltage and current of the consumption circuit. Thus the range of control of the grid potential may be made comparatively small and within desirable practical limits, while at the same time securing a very wide range of control of the voltage and current of the consumption circuit.

In Fig. 4 is another embodiment of this invention wherein the compounding effect is utilized with reference to variation of the grid potential. In this figure, the compounding effect is utilized also in varying the voltage of the plate circuit which may be used, when desired, in addition to the variation of grid potential, although sufficient range of control may, in some cases, be obtained by utilizing the compounding effect with reference to the grid potential and subjecting the plate circuit to a practically constant voltage.

In Fig. 4 the plate circuit is connected through the exciting winding 5 directly across the terminals of the consumption circuit at the points 10 and 11, although the connection may be made to an intermediate point of the windings 2, if desired, as already explained with reference to Fig. 2. For the purpose of varying the grid potential, a coupling transformer 21 has its primary connected across the terminals of the windings 2 from the point 10 to the point 20, so that the voltage supplied to this transformer is dependent upon the variation in voltage at the terminals of the windings 2. If desired, the primary of the transformer 21 may have one of its terminals tapped into a device across the load circuit at some intermediate point so as to modify the voltage and variations in voltage applied to the primary of the transformer to suit particular requirements. The secondary of the transformer 21 is connected in series in the grid circuit and likewise connected in series in this circuit is a phase adjuster 22 for use when necessary to secure the proper phase of the varying alternating current potential derived from the transformer 21 in relation to the alternating current potential to which the plate circuit is subjected by reason of its connection across the points 10 and 11. It is evident that the voltage to which the primary of the coupling transformer 21 is subjected is such that it varies inversely as the voltage across the consumption circuit. In some cases, the coupling transformer 21 may be omitted and the grid circuit connected in relation to the windings 2, so as to be directly affected by change of voltage which will be inverse with reference to the voltage of the consumption circuit.

As regards the operation of the apparatus of Fig. 4, it will be apparent that when the contact 18 is adjusted to give maximum current in the winding 5 of the reactor, the plate circuit is receiving its maximum voltage applied thereto; and the grid potential, as regards the compounding effect of the voltage across the windings 2, is a minimum. As the contact 18 is adjusted to reduce the current in the plate circuit, the voltage applied to the consumption circuit is correspondingly reduced, which in turn further reduces the voltage applied to the plate circuit as already explained with reference to Fig. 3. As regards the change of potential of the grid, as affected by the change in the alternating current circuit conditions, the voltage across the windings 2 has increased with decrease in current of the winding 5. This increase affects the grid circuit so as to make the grid potential more negative with respect to the cathode and thus has a still further compounding effect in reducing the current supplied to the winding 5. Thus the range of control is extended over wide limits; and a comparatively small adjustment of the contact 18 creates very pronounced effects by reason of the interaction of the different parts and their cumulative compounding effect.

Although I have described certain embodiments of my invention, it will be understood that the same may be modified without departing from the scope thereof, and that instead of using the particulalr types of apparatus described, various other forms of controlling apparatus may be used and that the particular forms thereof may also be varied according to the preference of those skilled in the art and of the requirements for particular applications.

I claim:

1. The combination of a reactor having an alternating current winding supplying an adjustable voltage to a consumption circuit and having a direct current winding for adjusting the reactance, a rectifier supplying current to said winding and having a cathode and anode, adjustable means shunting the rectifier for adjustably controlling the output thereof to said direct current winding, and connections whereby the voltage supplied to the circuit of the rectifier is caused to be affected by changes in the voltage supplied to the consumption circuit.

2. The combination of a reactor having an alternating current winding supplying an adjustable voltage to a consumption circuit and having a direct current winding for adjusting the reactance, a rectifier supplying current to said winding and having a cathode and anode, an impedance device shunting the rectifier for adjustably controlling the output thereof to said direct current winding, and connections whereby the voltage supplied to the circuit of the rectifier is caused to be affected by changes in the voltage supplied to the consumption circuit.

3. The combination of a reactor having an alternating current winding supplying an adjustable voltage to a consumption circuit and having a direct current winding for adjusting the reactance, a rectifier supplying current to said winding and having a cathode and anode, an impedance device shunting the rectifier for adjustably controlling the output thereof to said direct current winding, and connections whereby the voltage supplied to the circuit of the rectifier is caused to be affected by changes in the voltage supplied to the consumption circuit to cumulatively affect said reactor to correspondingly amplify the changed voltage supplied to the consumption circuit.

4. The combination of an alternating current supply circuit, a consumption circuit, a reactor having a winding connected in series between the supply circuit and the consumption circuit and having a direct current winding for adjusting over a wide range the voltage supplied to the consumption circuit, a device having an anode, cathode and control element, means for adjusting an electric condition of said control element for adjusting the current supplied by said device to said direct current winding, said means being adjustable independently of change of voltage of the consumption circuit, and means whereby the anode circuit of said device is caused to be subjected to change in voltage supplied to the consumption circuit and to thereby cumulatively affect said reactor to correspondingly amplify the change of current supplied to the consumption circuit.

5. The combination of an alternating current supply circuit, a consumption circuit, a reactor having a winding connected in series between the supply circuit and the consumption circuit and having a direct current winding for adjusting over a wide range the voltage supplied to the consumption circuit, a device having an anode, cathode and control element, means for adjusting an electric condition of said control element for adjusting the current supplied by said device to said direct current winding, said means being adjustable independently of change of voltage of the consumption circuit, and means whereby the control element circuit of said device is caused to be supplied with voltage affected inversely to the change in voltage of the consumption circuit.

6. The combination of an alternating current supply circuit, a consumption circuit, a reactor having a winding connected in series between the supply circuit and the consumption circuit and having a direct current winding for adjusting over a wide range the voltage supplied to the consumption circuit, a device having an anode, cathode and control element, means for adjusting an electric condition of said control element for adjusting the current supplied by said device to said direct current winding, said means being adjustable independently of change of voltage of the consumption circuit, and means whereby the control element circuit of said device is caused to be supplied with voltage affected inversely to the change of voltage of the consumption circuit and whereby the anode circuit of said device is caused to be subjected to the change in voltage supplied to the consumption circuit and to thereby cumulatively affect said reactor to correspondingly amplify the change of current supplied to the consumption circuit.

7. The combination of an alternating current supply circuit, a consumption circuit, a reactor having a winding connected in series between the supply circuit and the consumption circuit and having a direct current winding for adjusting over a wide range the voltage supplied to the consumption circuit, a rectifier comprising an anode and cathode, said rectifier supplying current to said direct current winding, means for adjustably controlling the output of said rectifier, said means being adjustable independently of change of voltage of the consumption circuit, and connections whereby the voltage supplied to the circuit of the rectifier is caused to be affected by the change in the voltage supplied to the consumption circuit and to thereby cumulatively affect said reactor to correspondingly amplify the change of voltage supplied to said consumption circuit.

8. The combination of a reactor having an alternating current winding supplying a variable voltage to a consumption circuit and having a direct current winding for varying the reactance, a rectifier supplying current to said winding and having a cathode and anode, a reactor in the circuit of said rectifier, an impedance device shunting the rectifier for variably controlling the output thereof to said direct current winding, and connections whereby the voltage supplied to the circuit of the rectifier is caused to be affected by changes in the voltage supplied to the consumption circuit to cumulatively affect said reactor to correspondingly amplify the changed voltage supplied to the consumption circuit.

9. The combination of a reactor having an alternating current winding supplying a variable voltage to a consumption circuit and having a direct current winding for varying the reactance, a rectifier supplying current to said winding and having a cathode and anode, a reactor in the anode circuit of said rectifier, an impedance device shunting the rectifier for variably controlling the output thereof to said direct current winding, and connections whereby the voltage supplied to the circuit of the rectifier is caused to be affected by changes in the voltage supplied to the consumption circuit to cumulatively affect said reactor to correspondingly amplify the changed voltage supplied to the consumption circuit.

10. The combination of a reactor having an alternating current winding supplying a variable voltage to a consumption circuit and having a direct current winding for varying the reactance, a rectifier supplying current to said winding and having a cathode and anode, a reactor in series in the circuit of said rectifier, an impedance device shunting the rectifier for variably controlling the output thereof to said direct current winding, said impedance device being connected from a point between said last named reactor and one of the terminals of the rectifier to another terminal of the rectifier, and connections whereby the voltage supplied to the circuit of the rectifier is caused to be affected by changes in the voltage supplied to the consumption circuit to cumulatively affect said reactor to correspondingly amplify the changed voltage supplied to the consumption circuit.

11. The combination of an alternating current supply circuit, an alternating current consumption circuit, a reactor for adjusting over a wide range the voltage supplied to said consumption circuit, said reactor having a winding connected in series between the supply circuit and said consumption circuit and having a second winding for varying the reactance, an auxiliary controlling device connected to said alternating current consumption circuit and subjected to change of voltage thereof and receiving energy therefrom for supplying direct current to said second winding, and means for adjusting over a wide range the direct current output from said controlling device to said second winding independently of change of voltage of said consumption circuit for changing the voltage of said consumption circuit over a wide range, the connections of said controlling device to said consumption circuit and to said second winding being related to cause said reactor to further amplify any change of voltage of said consumption circuit.

12. The combination of an alternating current supply circuit, an alternating current consumption circuit, a reactor having a winding connected in series between the supply circuit and said consumption circuit and having a direct current winding for adjusting over a wide range the voltage supplied to said consumption circuit, a controlling rectifier connected to said alternating current consumption circuit and subjected to change of voltage thereof and receiving energy therefrom for supplying direct current to said direct current winding, and means for adjusting the current delivered by said rectifier to said direct current winding independently of change of voltage of said consumption circuit for changing the voltage of said consumption circuit over a wide range, the connections of said rectifier to said consumption circuit and to said direct current winding being related to cause said reactor to further amplify any change of voltage of said consumption circuit.

FRANK G. LOGAN.